US012686317B2

(12) United States Patent
Chen et al.

(10) Patent No.: US 12,686,317 B2
(45) Date of Patent: Jul. 21, 2026

(54) GANTRY SYSTEM FOR ENABLING BIN MOVEMENT IN A DELIVERY VEHICLE

(71) Applicant: Ford Global Technologies, LLC, Dearborn, MI (US)

(72) Inventors: Yifan Chen, Ann Arbor, MI (US); Kurt Michael Lundeen, Novi, MI (US); Sam Hoff, Hazel Park, MI (US); Smruti Panigrahi, Novi, MI (US); Kevin Hwang, Northville, MI (US); Timothy Mark Feldkamp, Ann Arbor, MI (US)

(*) Notice: Subject to any disclaimer, the term of this patent is extended or adjusted under 35 U.S.C. 154(b) by 380 days.

(21) Appl. No.: 18/457,045

(22) Filed: Aug. 28, 2023

(65) Prior Publication Data

US 2025/0074287 A1      Mar. 6, 2025

(51) Int. Cl.
B60P 1/54         (2006.01)
B60P 1/64         (2006.01)

(52) U.S. Cl.
CPC ........... B60P 1/5442 (2013.01); B60P 1/6463 (2013.01); B60P 1/6472 (2013.01)

(58) Field of Classification Search
CPC ............................ B60P 1/5442; B25J 15/0047
See application file for complete search history.

(56) References Cited

U.S. PATENT DOCUMENTS

| | | | | | |
|---|---|---|---|---|---|
| 2,370,482 | A | * | 2/1945 | Morgan .................... | B66C 1/54 |
| | | | | | 29/261 |
| 3,572,513 | A | * | 3/1971 | Tantlinger ............. | B60P 1/5442 |
| | | | | | 212/73 |
| 4,297,071 | A | * | 10/1981 | Dunbar ..................... | B60P 1/36 |
| | | | | | 414/542 |
| 5,338,147 | A | * | 8/1994 | Kucharczyk .......... | B60P 1/5442 |
| | | | | | 187/410 |
| 5,743,702 | A | * | 4/1998 | Gunderson ........... | B60P 1/5442 |
| | | | | | 224/403 |
| 6,126,379 | A | * | 10/2000 | Feldman ............... | B60P 1/5442 |
| | | | | | 414/560 |
| 9,079,314 | B2 | * | 7/2015 | Kitamura ............. | B25J 15/0253 |
| 10,328,583 | B2 | * | 6/2019 | Yin ....................... | B25J 15/0014 |
| 10,815,057 | B2 | * | 10/2020 | Fosnight .............. | B65G 1/0464 |
| 11,119,487 | B2 | | 9/2021 | Jarvis et al. | |
| 2018/0141211 | A1 | | 5/2018 | Wellman et al. | |
| 2021/0387808 | A1 | | 12/2021 | Kalouche | |
| 2022/0119210 | A1 | | 4/2022 | Felton et al. | |
| 2022/0281371 | A1 | | 9/2022 | Meador et al. | |
| 2022/0281372 | A1 | * | 9/2022 | Seemüller ............. | B60P 1/5442 |
| 2022/0371636 | A1 | * | 11/2022 | Candelario .............. | B65G 1/02 |
| 2024/0051770 | A1 | * | 2/2024 | Dettorre ................. | B25J 9/1697 |

OTHER PUBLICATIONS

Honeywell, Honeywell Announces Fully Automated Robotic Unloader for Distribution Centers, Apr. 5, 2019, pp. 1-3.

* cited by examiner

*Primary Examiner* — Jonathan Snelting
(74) *Attorney, Agent, or Firm* — Emily Campbell; Eversheds Sutherland (US) LLP

(57)         ABSTRACT

A delivery vehicle having a base and a bin engagement unit is disclosed. The base may be configured to secure a plurality of bins. Each bin may include a plurality of sidewalls, and each sidewall may include an interior surface and an exterior surface. The bin engagement unit may be configured to move in a two-dimensional (2D) space in proximity to the base. The bin engagement unit may be configured to engage with the interior surface of a bin, from the plurality of bins, and slide the bin on the base when the bin engagement unit engages with the interior surface.

17 Claims, 11 Drawing Sheets

1100

1102 — Start

1104 — Obtain a trigger signal

1106 — Cause a bin engagement unit to move in proximity to an interior surface of a bin 1108 — Cause the bin engagement unit to engage with the interior surface 1110 — Cause the bin engagement unit to slide the bin on a base 1112 — Stop

GANTRY SYSTEM FOR ENABLING BIN MOVEMENT IN A DELIVERY VEHICLE

FIELD

The present disclosure relates to a delivery vehicle and more particularly to a gantry system for enabling bin movement in the delivery vehicle.

BACKGROUND

With the continued growth of internet-based commerce, package delivery is increasingly used to deliver goods to customers. Specifically in the US, e-commerce business is expected to continue to grow in the years to come.

Unprecedented growth is received favorably by e-commerce companies; however the rapid growth also leads to operational challenges in the supply chain. E-commerce companies and their delivery partners deliver an ever-increasing number of packages per day, while trying to limit spend on resources (e.g., labor, etc.) and reduce delivery time.

Various approaches are currently used to optimize the process of loading/unloading delivery packages to/from a delivery vehicle, and the process of delivering packages to respective delivery locations. For example, E-commerce companies load packages with similar delivery addresses in proximity to each other in a delivery vehicle to gain efficiency in unloading packages.

Despite the efforts of E-commerce companies, package loading/unloading process is still time consuming and requires considerable manual effort. For example, moving a package from its storage location in the delivery vehicle to a package unloading area in the vehicle is still a manual process, and hence requires considerable time and effort. Thus, there exists a need for a system that facilitates autonomous package movement within the delivery vehicle during loading/unloading operation.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
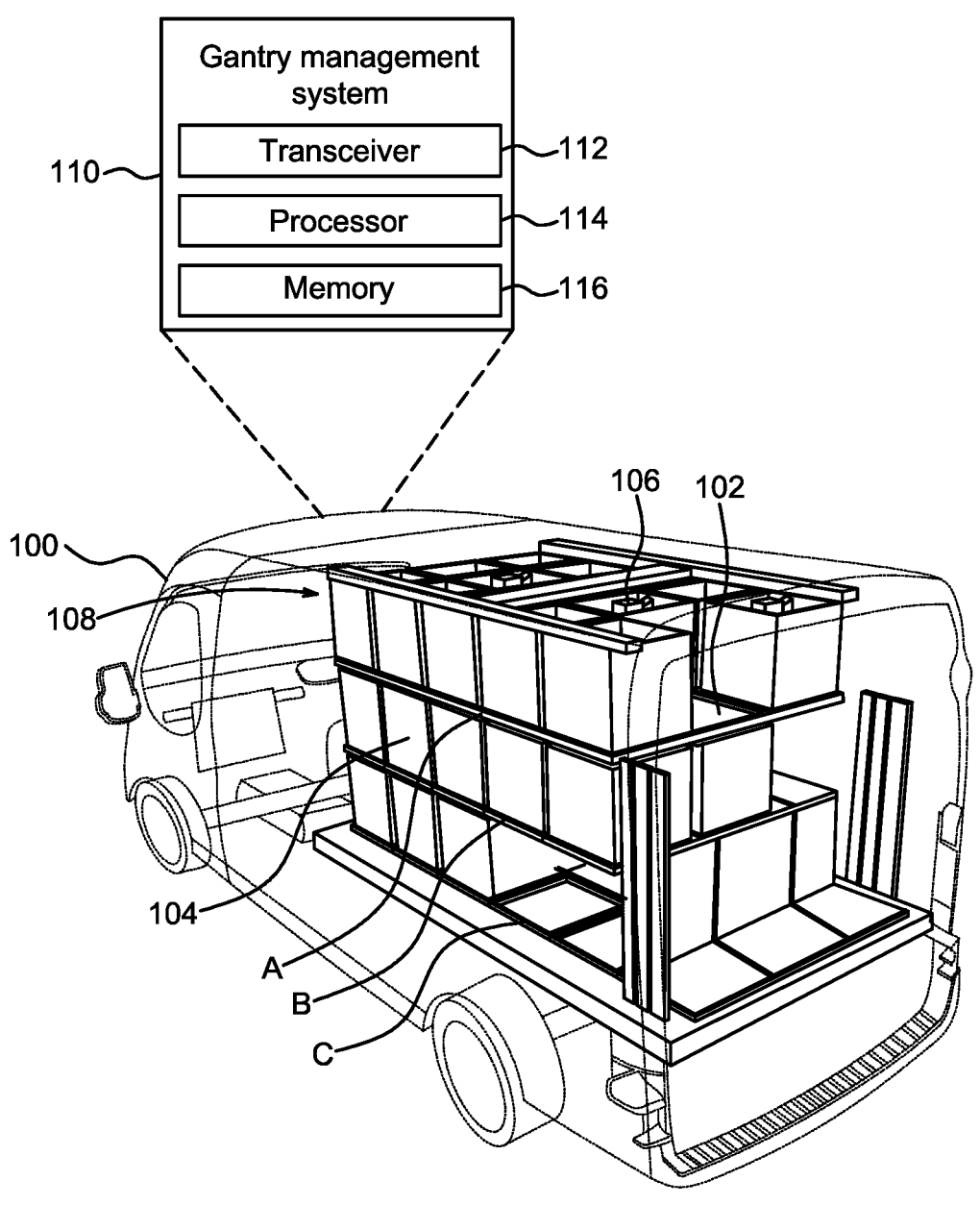
FIG. 1 depicts an example delivery vehicle in which techniques and structures for providing the systems and methods disclosed herein may be implemented.

The present disclosure describes a delivery vehicle having a gantry system disposed in a vehicle interior portion. The delivery vehicle may include a base configured to secure a plurality of bins in which a plurality of delivery packages may be stored. The base may be a vehicle cargo bed or one or more shelves disposed in the vehicle interior portion. The system may include a bin engagement unit ("unit") that may be configured to engage with a bin, from the plurality of bins, and slide the bin on the base. For example, when the delivery vehicle reaches a delivery location associated with a package stored in the bin, the system may cause the unit to engage with the bin and slide the bin on the base from its storage location to a bin/package pickup zone in the vehicle interior portion, from where a vehicle operator or a drone may pick the bin/package for last-mile delivery.

In some aspects, the bin may include one or more bin sidewalls, and each bin sidewall may include an interior surface and an exterior surface. Further, the unit may include telescopic arms that may be configured to move between a retracted position and an extended position. In an exemplary aspect, to engage the unit with the bin, the system may move the telescopic arms from the retracted position to the extended position when the unit may be disposed in proximity to the bin (specifically in proximity to the bin sidewall interior surface). Responsive to the telescopic arms being moved to the extended position, proximal ends of the telescopic arms may "press" against the bin sidewall interior surface, thus enabling locking or engagement between the unit and bin. The unit may slide the bin on the base when the telescopic arms lock against the bin sidewall interior surface.

In further aspects, each bin sidewall may include a cut-out disposed at a sidewall top portion. When the unit may be required to move in a 2-Dimensional (2D) space in proximity to the base without interfering with or sliding any bin, the system may cause the telescopic arms to move to the retracted position and cause the unit to move in the 2D space via the cut-outs included in the bin sidewalls. In some aspects, the unit may conveniently move in the 2D space via the cut-outs without interfering with any bins when the telescopic arms may be in the retracted position.

In additional aspects, the unit may include a plate having protruding pins, and each bin may include cavities disposed at a bin top portion/periphery or bin top edges. The unit may engage with the bin by inserting the protruding pins into the cavities. In further aspects, the plate may include a first gripping surface and the bin top portion/periphery may include a second gripping surface. The unit may engage with the bin by "meshing" or engaging the first gripping surface with the second gripping surface. In yet another aspect, the unit may include an electromagnet and the bin may include a magnet or a ferrous material. The unit may engage with the bin by magnetically coupling the electromagnet with the ferrous material/magnet associated with the bin.

The present disclosure discloses a gantry system that enables autonomous bin movement in a vehicle interior portion, thereby eliminating or minimizing manual effort required for loading/unloading bins or delivery packages to/from a delivery vehicle. Further, since the gantry system slides the bins on the base, hardware associated with moving wheels, actuators, etc. associated with conventional bin movement systems are not required in the gantry system disclosed in the present disclosure.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example delivery vehicle 100 (or vehicle 100) in which techniques and structures for providing the systems and methods disclosed herein may be implemented. The vehicle 100 may be a truck, a van (including walk-in vans), a truck trailer, and/or the like. In some aspects, the vehicle 100 may be an autonomous vehicle. In other aspects, a driver (not shown) may operate the vehicle 100. Further, the vehicle 100 may include any powertrain such as, for example, a gasoline engine, one or more electrically-actuated motor(s), a hybrid system, etc.

The vehicle 100 may include a base 102 that may be configured to secure a plurality of bins 104. The base 102 may be, for example, a vehicle cargo bed and/or one or more shelves disposed in a vehicle cargo space on which the plurality of bins 104 may be placed. In the exemplary aspect depicted in FIG. 1, the vehicle 100 includes three shelves (or three "base portions") disposed at different heights from the vehicle cargo bed within the vehicle cargo space. For example, a first base is depicted to be disposed at an upper cargo space layer (upper base "A"), a second base is disposed at a middle cargo space layer (middle layer "B"), and a third base is disposed at a lower cargo space layer (lower layer "C"). The present disclosure is not limited to the exemplary base arrangement depicted in FIG. 1, and the vehicle 100 may include more or less count of base portions.

In some aspects, a base top surface (on which the plurality of bins 104 may be placed) may be made of a material with low-to-medium coefficient of friction, which may enable the bins 104 to conveniently move or "slide" on the base top surface. In this case, a bin bottom surface (that may touch the base top surface) may also be made of a material with low-to-medium coefficient of friction to enable efficient and "smooth" bin sliding movement on the base 102. Structural details of the bin 104 are described in detail later below in conjunction with FIG. 4.

Each bin 104 may be configured to hold one or more delivery packages 106 that the vehicle 100 may be required to deliver to respective delivery addresses. In some aspects, location of each bin in the vehicle 100 and allocation of each package in each bin may be optimally pre-planned or pre-set such that unloading of each package from the vehicle 100 may be convenient (e.g., when the vehicle 100 reaches a package delivery location). In some aspects, information associated with allocation of each package in each bin and location of each bin in the vehicle 100 may be received by the vehicle 100 from a server (not shown) via one or more network(s).

The network(s) described above may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In an exemplary aspect, the server described above may be associated with an E-commerce firm or a delivery partner that may remotely monitor and/or control movement of a plurality of vehicles operating as part of a vehicle fleet (including the vehicle 100), loading/unloading operation for each vehicle in a warehouse or during transit, and/or the like. The server may transmit the information described above at a predefined frequency to the vehicle 100 during vehicle transit on a delivery route, or when the vehicle 100 commences the delivery route from the warehouse.

The vehicle 100 may further include a gantry system 108 that may be disposed in a vehicle interior portion. The gantry system 108 may enable bin movement in the vehicle interior portion during bin loading/unloading operation. Specifically, the gantry system 108 may slide a bin (e.g., the bin 104) on the base 102 responsive to receiving command signals from a vehicle on-board computer (not shown) and/or the server described above. In an exemplary aspect, the server and/or the vehicle on-board computer may transmit the command signals to the gantry system 108 to slide the bin 104 from its storage location on the base 102 to a bin unloading area/package pick-up zone (not shown) in the vehicle 100 when, for example, the vehicle 100 reaches a delivery location associated with a package stored in the bin 104. Responsive to the bin 104 reaching to the bin unloading area/package pick-up zone, a vehicle operator or a drone may pick the bin/package for last-mile delivery or for unloading.

The gantry system 108 may include or may be associated with a gantry management system 110 that may be part of the vehicle 100 and communicatively coupled with the vehicle on-board computer. The gantry management system 110 may include a transceiver 112, a processor 114 and a memory 116. The transceiver 112 may be configured to receive the information (described above) associated with the bins 104 and the packages 106 from the server, and/or the command signals from the vehicle on-board computer and/or the server. The transceiver 112 may transmit the received information and the command signals to the processor 114, and to the memory 116 for storage purpose.

Responsive to obtaining the information and the command signals from the transceiver 112, the processor 114 may cause the gantry system 108 to move or slide the bin 104 on the base 102 from a first location (e.g., from bin's storage location in the vehicle 100) to a second location (e.g., the bin unloading area/package pick-up zone).

The processor 114, as described above, may be disposed in communication with one or more memory devices disposed in communication with the respective computing systems (e.g., the memory 116 and/or one or more external databases not shown in FIG. 1). The processor 114 may utilize the memory 116 to store programs in code and/or to store data for performing aspects in accordance with the disclosure. The memory 116 may be a non-transitory computer-readable storage medium or memory storing gantry management system program code or instructions. The memory 116 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

Structural details of the gantry system 108 are described in detail below in conjunction with subsequent figures.

The vehicle 100, the vehicle operator and the gantry system 108 implement and/or perform operations, as described here in the present disclosure, in accordance with the owner manual and safety guidelines.

Figure 2:
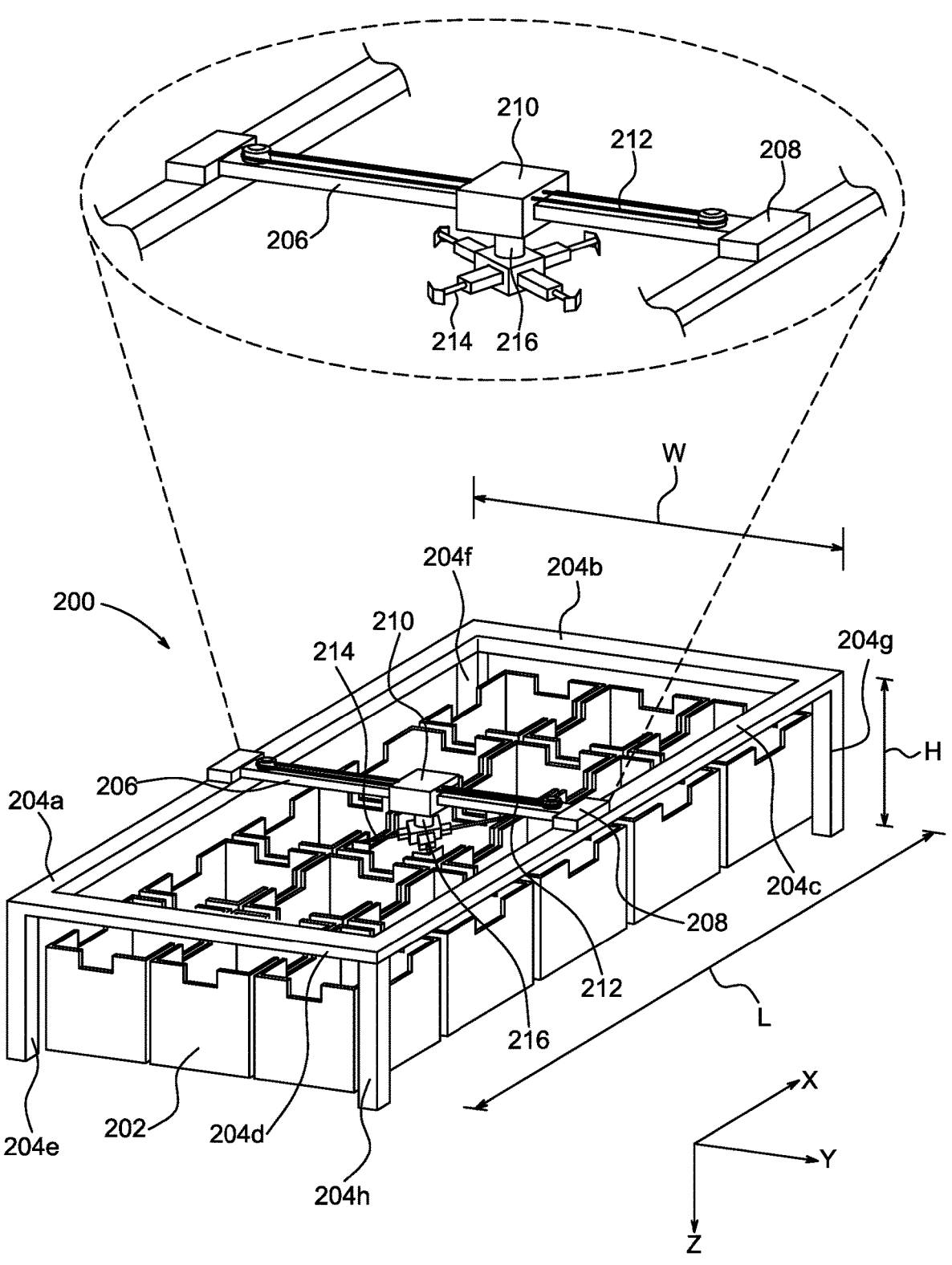
FIG. 2 depicts an example first gantry system in accordance with the present disclosure.

FIG. 2 depicts an example first gantry system 200 in accordance with the present disclosure. The gantry system 200 (system 200) may be same as the gantry system 108 described above in conjunction with FIG. 1. While describing FIG. 2, references will be made of FIGS. 3 and 4.

The system 200 may be disposed on the base 102 (not shown in FIG. 2) or the base 102 may be part of the system 200 (e.g., when the base 102 is a shelf). As described above in conjunction with FIG. 1, the base 102 may be configured to secure a plurality of bins 202 on a base top surface. In some aspects, the system 200 may include a structure that may include one or more rails and/or a support structure. In an exemplary aspect, the system 200 may include a plurality of rails including, but not limited to, a first rail 204a, a second rail 204b, a third rail 204c, a fourth rail 204d, a fifth rail 204e, a sixth rail 204f, a seventh rail 204g and an eighth rail 204h (collectively referred to as a plurality of rails 204). In another exemplary aspect, structures depicted as 204a and 204c in FIG. 2 may be rails of the system 200, and the structures depicted as 204b, 204d-h may be support structures. Exemplary arrangement of rails and/or support structures shown in FIG. 2 should not be construed as limiting. In a preferred aspect, 204a and 204c are rails, and 204b, 204d-h are support structures of the system 200.

The plurality of rails 204 may be made of any material including, but not limited to, steel, aluminum, iron, and/or the like. Dimensions of each rail 204 may depend on dimensions of the vehicle 100, the base 102, the bins 202, and/or the like. The first and third rails 204a, 204c may be disposed parallel to each other at a first predefined distance "W". Further, the first and third rails 204a, 204c may be disposed over the base 102 at a second predefined distance "H" from the base 102. In an exemplary aspect, a length of each of the first and third rails 204a, 204c may be "L", as shown in FIG. 2.

The second and fourth rails 204b, 204d may be disposed parallel to each other, and perpendicular to the first and third rails 204a, 204c. The second and fourth rails 204b, 204d may be disposed at the distance "L" from each other, and may be disposed at the second predefined distance "H" above the base 102. In some aspects, the first, second, third and fourth rails 204a-d may form a rectangular frame.

The fifth, sixth, seventh and eighth rails 204e-h may be disposed perpendicular to the rectangular frame described above, and each of the fifth, sixth, seventh and eighth rails 204c-h may have a length equivalent to "H". In some aspects, the first-eight rails 204a-h may define an enclosure over the base 102 in which the plurality of bins 202 may be placed.

The system 200 may further include a ninth rail 206 that may be disposed perpendicular to the first and third rails 204a, 204c, and parallel to the second and fourth rails 204b, 204d. The ninth rail 206 may be configured to slide along the lengths of the first and third rails 204a, 204c, via a motor system 208. In some aspects, the processor 114 may activate and control motor system movement and hence control ninth rail sliding motion on the first and third rails 204a, 204c, based on the command signals obtained from the vehicle on-board computer, the server or a user device associated with a vehicle operator.

The system 200 may further include a bin engagement unit 210 (or unit 210) that may be disposed on the ninth rail 206, and configured to slide along a ninth rail length via actuation/movement of cables 212 and the motor system 208. In some aspects, the unit 210 and the motor system 208 may be communicatively coupled with the processor 114. Further, in some aspects, the motor system 208 may enable bin engagement unit sliding movement on the ninth rail 206 by using the cables 212, based on command signals obtained from the processor 114 (and hence from the vehicle on-board computer, the server or the user device).

A person ordinarily skilled in the art may appreciate from the description above that since the ninth rail 206 is configured to slide on the first and third rails 204a, 204c and the unit 210 is configured to slide on the ninth rail 206, the unit 210 may be configured to move in a 2-Dimensional (2D) space (e.g., in X-Y plane) in proximity to the enclosure or the base 102. In further aspects, the unit 210 may include a plurality of telescopic arms 214 and an attachment mechanism 216. Distal end of each telescopic arm 214 may be attached to the attachment mechanism 216, and the attachment mechanism 216 may be attached to the unit 210 which slides on the ninth rail 206. In some aspects, the attachment mechanism 216 may further enable the telescopic arms 214 to move up and down relative to a ninth rail plane, i.e., in Z-direction.

In an exemplary aspect, the unit 210 may include four telescopic arms 214, although the present disclosure is not limited to this count of telescopic arms. In other aspects, the unit 210 may include more or less count of telescopic arms 214. Each telescopic arm 214 may be configured to move between a retracted position (shown as position "A" in FIG. 3) and an extended position (shown as position "B" in FIG. 3) to enable the telescopic arm 214 to engage with the bin 202 and move the bin 202 from one location to another on the base 102, as described below.

Figure 3:
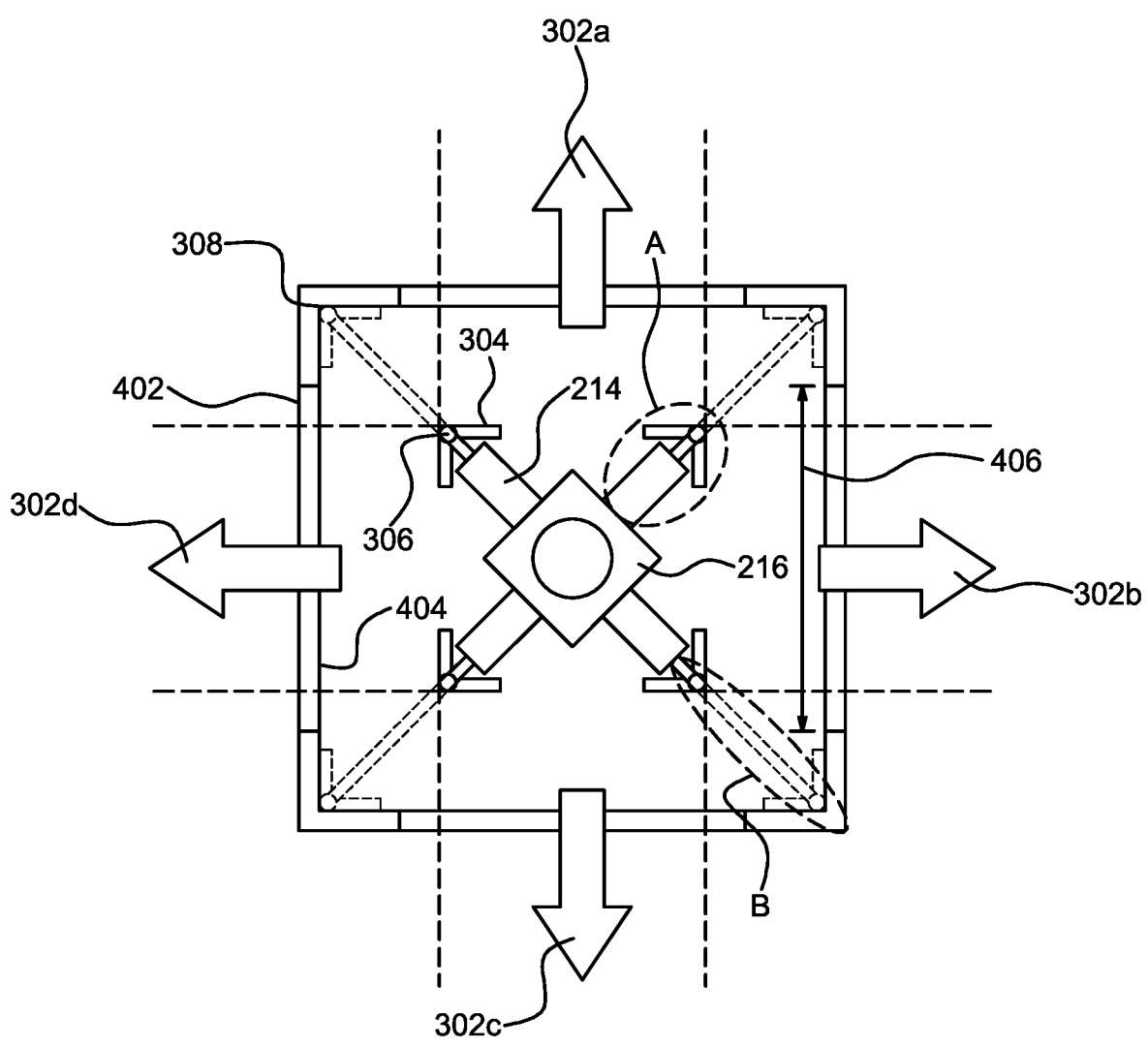
FIG. 3 depicts a top view of a bin and a first bin engagement unit in accordance with the present disclosure.
Figure 4:
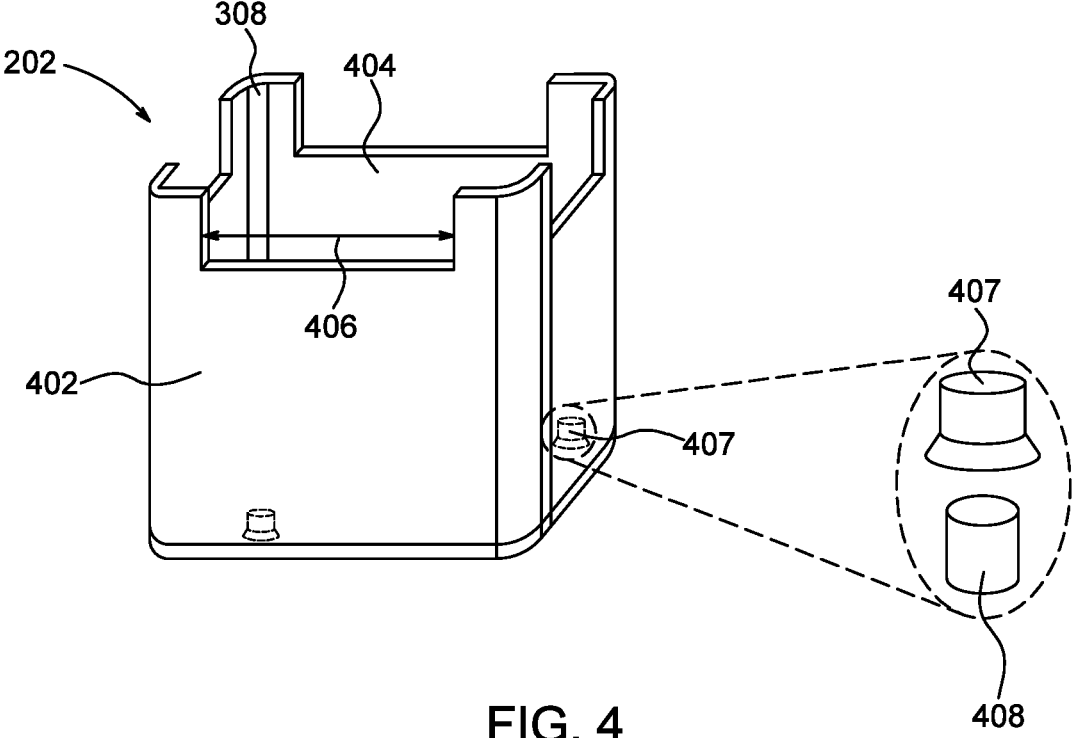
FIG. 4 depicts an isometric view of a bin in accordance with the present disclosure.

In some aspects, each bin 202 may have a plurality of sidewalls (e.g., four sidewalls), and each sidewall may include an exterior surface 402 and an interior surface 404, as shown in FIGS. 3 and 4. Each sidewall may further include a cutout 406 disposed at a sidewall top portion, as shown in FIG. 4. The unit 210 may be configured to engage with the interior surface 404, and move/slide the bin 202 from one location to another on the base 102 responsive to engaging with the interior surface 404.

In operation, the processor 114 may obtain a trigger or command signal from the vehicle on-board computer, the server and/or the user device associated with the vehicle operator. In an exemplary aspect, the trigger signal may be obtained when the vehicle 100 may have reached a delivery location associated with a package stored in the bin 202. In some aspects, the trigger signal may include a bin source location (i.e., a location on the base 102 where the bin 202 may be currently placed) and a bin destination location (e.g., a location on the base 102 where the bin 202 may be required to be moved to, e.g., a bin/package pickup zone). Responsive to obtaining the trigger signal, the processor 114 may send commands signals to the motor system 208 and the unit 210, to cause the unit 210 to move in proximity to the bin 202 (specifically, in proximity to the interior surface 404).

In some aspects, to move the unit 210 in proximity to the bin 202, the unit 210 may be required to pass through one or more other bins that may be placed on the base 102. To ensure that movement of the unit 210 does not interfere with placement of other bins, responsive to receiving the command signals from the processor 114, the unit 210 may move the telescopic arms 214 to respective retracted positions (shown as position "A" in FIG. 3). When the telescopic arms 214 may be in the retracted positions, the unit 210 may conveniently move in the 2D space in proximity to the enclosure or the base 102 via the cutouts 406 of respective bins, without interfering with placement of the bins. An example unit movement through the cutouts 406 (when the telescopic arms 214 may be in the retracted positions) is shown in FIG. 3 as movements 302*a-d*.

Responsive to determining that the unit 210 may have reached in proximity to the bin 202 (specifically in proximity to the interior surface 404), the processor 114 may transmit another command signal to the unit 210 to cause the unit 210 to move the telescopic arms 214 from the retracted positions to the extended positions (shown as position "B" in FIG. 3), and thus engage with the bin 202/interior surface 404. In some aspects, when the telescopic arms 214 move to the extended positions, proximal ends of the telescopic arms 214 may press against the interior surface 404 to lock/engage the unit 210 with the bin 202.

In an exemplary aspect, each telescopic arm proximal end may include a pressing plate or a bracket 304 and a pivot connector 306 (as shown in FIG. 3). The bracket 304 and the pivot connector 306 may enable the proximal end to press against different types/shapes of surfaces or structures of the bin interior surface. For example, as shown in FIG. 3, the bracket 304 and the pivot connector 306 may enable the proximal ends to press against bin corners 308 disposed in the interior surface 404. In some aspects, bracket shape and dimensions may correspond to bin corner shape and dimensions.

Responsive to the telescopic arms 214 engaging or locking with the bin 202 in the extended positions, the processor 114 may transmit another command signal to the unit 210 and the motor system 208 to cause unit movement (and hence bin movement) from the bin source location to the bin destination location. Specifically, responsive to receiving the command signal from the processor 114, the unit 210 may slide the bin 202 on the base 102 to move the bin 202 from the bin source location to the bin destination location.

In some aspects, the system 200 may include one or more additional units or components that are not shown in FIG. 2. For example, the system 200 may include a power source (e.g., a 24 Volt Direct Current (DC) power source) that may be configured to provide power/energy to the motor system 208 and the unit 210 to enable their respective movements/operations. In some aspects, the power source may be a vehicle battery or a separate power source disposed in the vehicle 100. In further aspects, the power source may provide power to the unit 210 and/or the motor system 208 via at least one of the plurality of rails 204 and the ninth rail 206.

In further aspects, the unit 210 may include one or more components (not shown) including, but not limited to, one or more rechargeable batteries, a transceiver (configured to receive command signals from the processor 114), a unit camera, and/or the like. In some aspects, the unit camera may include a fish-eye lens to enable the camera to capture images associated with a large Field of View (FOV). In other aspects, the unit camera may include an array of multiple cameras. The processor 114 may be configured to obtain images captured from the unit camera, and cause movement of the unit 210 based on the obtained images. For example, if the processor 114 detects that a bin may be incorrectly placed on the base 102 (based on the obtained images), the processor 114 may command the unit 210 to move/slide the misplaced bin to a correct position on the base 102. The present disclosure is not limited to the processor 114 using the images obtained from the unit camera to detect misplaced bins. In other aspects, the processor 114 may detect misplaced bins using images obtained from vehicle interior cameras and/or one or more vehicle sensors.

In some aspects, top portion or top edges of the bin 202 may be color coded, so that the processor 114 may conveniently identify the bin 202 from the images obtained from the unit camera and/or the vehicle camera, and detect if the bin 202 may be incorrectly placed on the base 102. In additional aspects, a bin bottom portion (or bin base) may include an attachment mechanism 407 (as shown in FIG. 4) that may secure the bin 202 to the base 102, e.g., when the bin 202 may not be required to be moved/slid on the base 102 by the unit 210. In the exemplary aspect depicted in FIG. 4, the attachment mechanism 407 may be a recess or a hole into which a pin 408 may be inserted.

The pin 408 may be a solenoid powered pin that may be disposed in an interior portion of the base 102 when the pin 408 may not be required to be inserted into the attachment mechanism 407. When the bin 202 may be required to be secured to the base 102 to prevent unwanted bin movement (e.g., during vehicle transit), a vehicle on-board computer or the processor 114 may transmit a command signal to the pin 408 to protrude from the base 102 and insert into the attachment mechanism 407. Responsive to the pin 408 inserting into the attachment mechanism 407, the bin 202 may be secured to the base 102. In addition, when the bin 202 may be required to be moved on the base 102, the vehicle on-board computer or the processor 114 may command the pin 408 to retract back into the base interior portion, thereby enabling the unit 210 to conveniently slide the bin 202 on the base 102.

In some aspects, multiple gantry systems (e.g., systems similar to the system 200 described above) may be attached at different layers within the vehicle interior portion. Further, each base associated with each gantry system may be configured to secure bins of different sizes, thus enabling a single vehicle (e.g., the vehicle 100) to secure bins (and hence packages) of different sizes.

Figure 5:
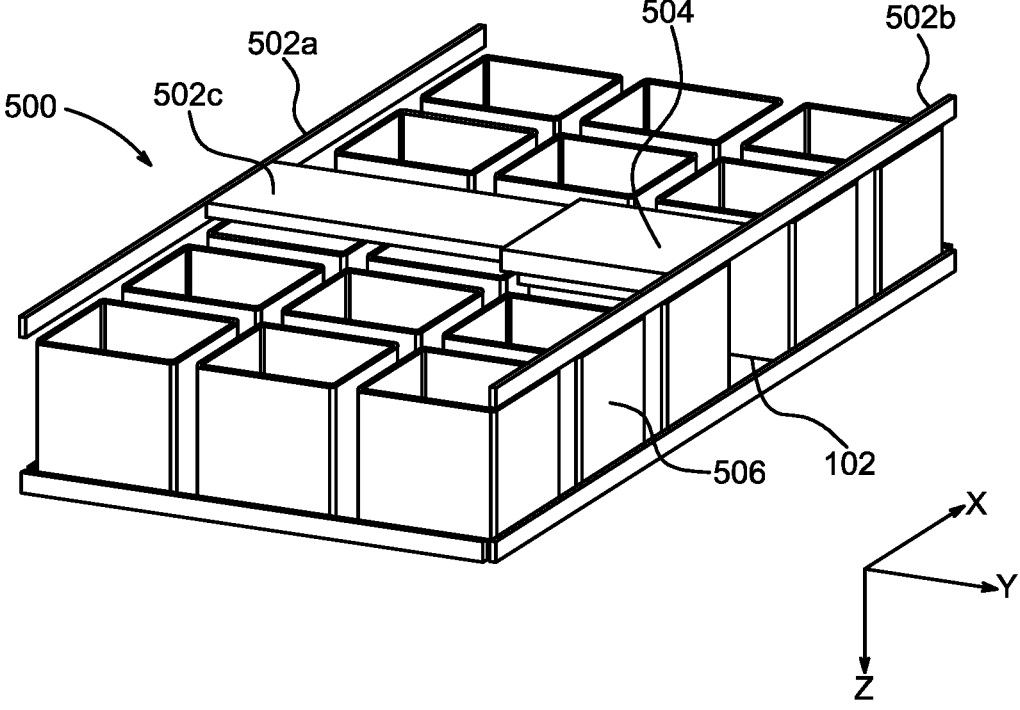
FIG. 5 depicts an example second gantry system in accordance with the present disclosure.

FIG. 5 depicts an example second gantry system 500 (or system 500) in accordance with the present disclosure. The system 500 may be same as the gantry system 108 described above in conjunction with FIG. 1. While describing FIG. 5, references will be made to FIGS. 6A, 6B, 7A, 7B, 8A, 8B and 9.

The system 500 may include a plurality of rails (similar to the plurality of rails 204 described above in conjunction with FIG. 2) including, but not limited to, a first rail 502*a*, a second rail 502*b*, a third rail 502*c*, and/or the like. The first and second rails 502*a*, 502*b* may be disposed parallel to each other, and the third rail 502*c* may be disposed perpendicular to the first and second rails 502*a*, 502*b*, as shown in FIG. 5. Further, the third rail 502*c* may be configured to move/slide along the lengths of the first and second rails 502*a*, 502*b* via a motor system (not shown) based on the command signals obtained from the processor 114, as described above.

The system 500 may further include a bin engagement unit 504 (or unit 504) that may be configured to engage with a bin 506 (similar to the bin 104 described above in conjunction with FIG. 1), and slide the bin 506 on the base 102 to move the bin 506 from one location to another. The unit 504 may be disposed on the third rail 502*c*, and configured to slide on a third rail length based on the command signals obtained from the processor 114. The unit 504 may be configured to move in the 2D space (i.e., the X-Y plane) in proximity to the base 102 by sliding on the third rail 502*c* and via the sliding movement of the first and second rails 502*a*, 502*b*.

Figure 6A:
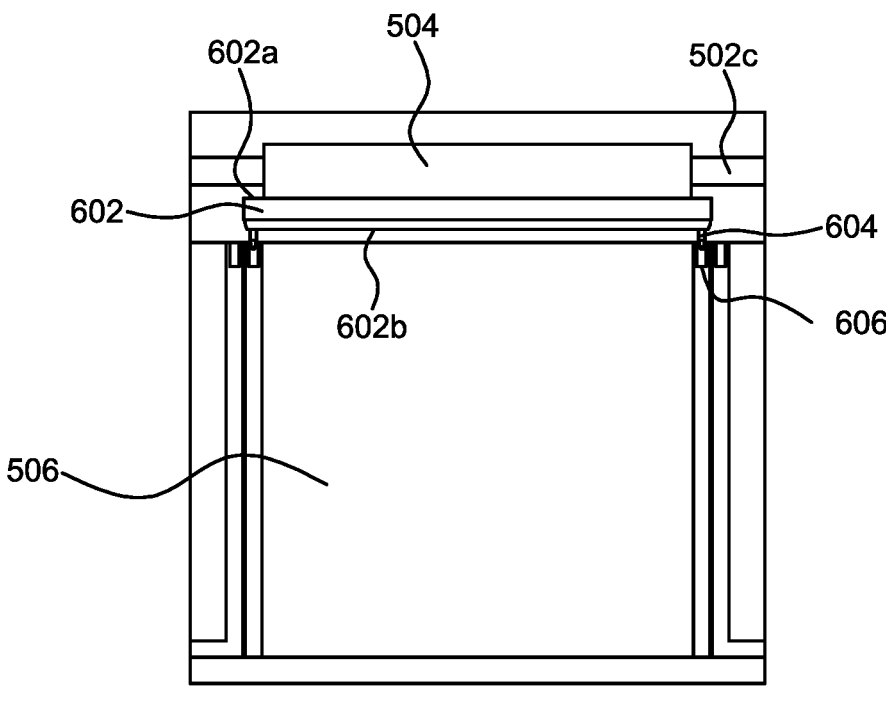
FIGS. 6A and 6B depict a second example bin engagement unit in different engagement positions in accordance with the present disclosure.
Figure 6B:
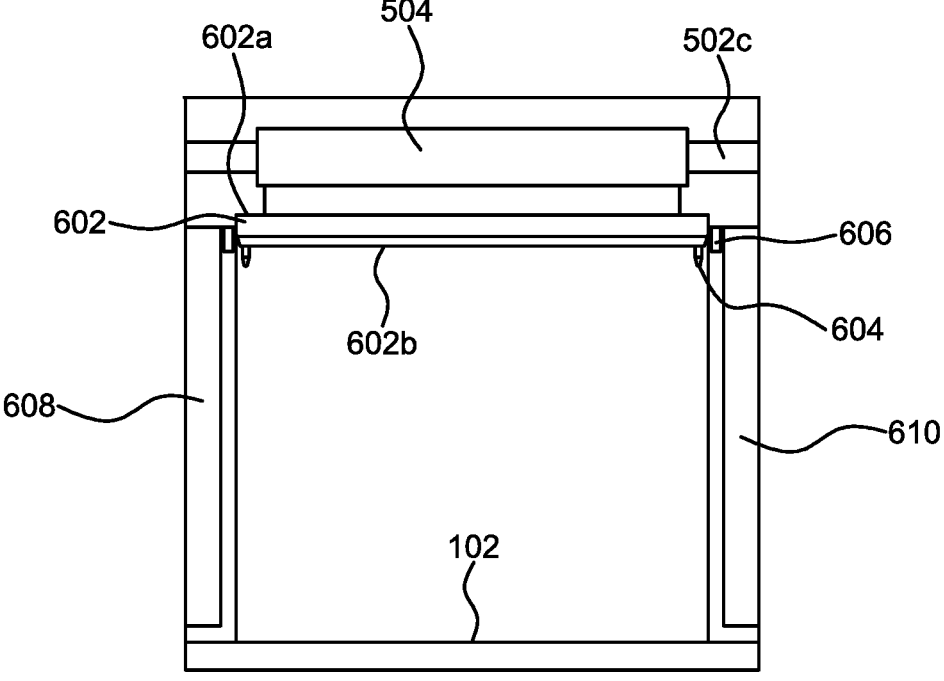

In some aspects, the unit 504 may include a plate 602 (as shown in FIGS. 6A and 6B) that may move up and down vertically in the Z-plane between a retracted position and an extended position. In some aspects, a plane of the plate 602 may be parallel to a plane of the third rail 502*c*. Further, the plate 602 may be disposed close to (i.e., in proximity to) the third rail 502*c* in the retracted position, and may be disposed farther away from the third rail 502*c* in the extended position. In some aspects, the plate 602 may include a top surface 602*a* and a bottom surface 602*b*. The top surface 602*a* may face the third rail 502*c* and the bottom surface 602*b* may face a top portion of the bin 506 (as shown in FIG. 6A) or the base 102 (as shown in FIG. 6B).

In some aspects, the plate 602 may be shaped as a rectangle or a square, and plate dimensions/shape may correspond to dimensions/shape of a top portion (e.g., top edges) of the bin 506. Furthermore, the plate 602 may include protruding pins 604 that may be disposed at the bottom surface 602*b*, and the bin 506 may include cavities/recesses 606 formed at the bin top portion, as shown in FIG. 6A. In some aspects, the protruding pins 604 may be disposed at the four corners of the plate 602, and the cavities 606 may be disposed at corresponding four corners of the bin top portion. In further aspects, protruding pin dimensions/shape may correspond to cavity dimensions/shape, so that the protruding pins 604 may conveniently insert into the cavities 606. Furthermore, the protruding pins 604 may be chamfered, conical, filleted or rounded, to enable the protruding pins 604 to conveniently insert into the cavities 606.

In operation, when the bin 506 may be required to be moved/slid on the base 102 from the first position (e.g., bin's storage location on the base 102) to the second position (e.g., the bin/package pickup zone), the processor 114 may transmit a command signal to the unit 504 (and the motor system described above) to cause the unit 504 to move in proximity to the bin 506, as described above. Responsive to receiving the command signal from the processor 114, the unit 504 may first move the plate 602 to the retracted position and then move in proximity to the bin 506. A person ordinarily skilled in the art may appreciate that the unit 504 may move the plate 602 to the retracted position to ensure that the protruding pins 604 do not interfere with bins placed on the base 102 when the unit 504 moves.

Responsive to the unit 504 reaching in proximity to (e.g., above) the bin 506, the processor 114 may send another command signal to the unit 504 to cause the plate 602 to move from the retracted position to the extended position.

When the plate 602 moves to the extended position, the protruding pins 604 may insert into the cavities 606, thereby locking or engaging the unit 504 with the bin 506. Responsive to the unit 504 being engaged with the bin 506, the processor 114 may transmit another command signal to the unit 504 to move the unit 504 from the first position to the second position (and hence slide the bin 506 on the base 102 from the first position to the second position).

Although the description above describes an aspect where the bin 506 includes the cavities 606, the present disclosure is not limited to the bin 506 having the cavities 606. In some aspects, the bin 506 may not include the cavities 606. In this case, the protruding pins 604 may enter bin's interior portion when the plate 602 may be in the extended position, and the protruding pins 604 may then push or press against interior surfaces of the bin sidewalls to lock the unit 504 with the bin 506.

In alternative aspects, as opposed to including the protruding pins 604, the plate 602 may include hollow extrusions (not shown) that may enter bin's interior portion when the plate 602 may be in the extended position, and the extrusions may then press against bin sidewall interior surfaces to lock the unit 504 with the bin 506. In this case, the extrusions may be chamfered, conical, filleted or rounded, to enable the extrusions to conveniently insert into the bin interior portion.

In further aspects, when the unit 504 may have moved the bin 506 from the first location to the second location or when the vehicle 100 may be in motion and unwanted bin movement on the base 102 may be desired to be prevented, the processor 114 may transmit a command signal to the unit 504 to move to a location on the base 102 where there may be no bin placed, and move the plate 602 to an enhanced extended position, as shown in FIG. 6B. In the enhanced extended position, the plate 602 may move down in the Z-plane to a space between two adjacent bins (e.g., bins 608 and 610, as shown in FIG. 6B) such that opposing edges of the plate 602 may touch the top portions of the bins 608 and 610. When the plate's opposing edges touch the top portions of the bins 608 and 610, the plate 602 may "lock" movement of the bins 608 and 610 on the base 102 (e.g., unwanted bin sliding movement caused due to vehicle motion). Further, in this case, when one or more bins may be required to be moved/slid on the base 102, the processor 114 may cause the plate 602 to move back to the retracted position, and then cause bin movement in the similar manner as described above.

In some aspects, if the protruding pins 604 are spaced considerably apart from each other on the bottom surface 602*b*, the protruding pins 604 may be used to prevent unwanted bin movement as opposed to using the plate 602 to lock the space between the bins 608 and 610, as described above.

Figure 7A:
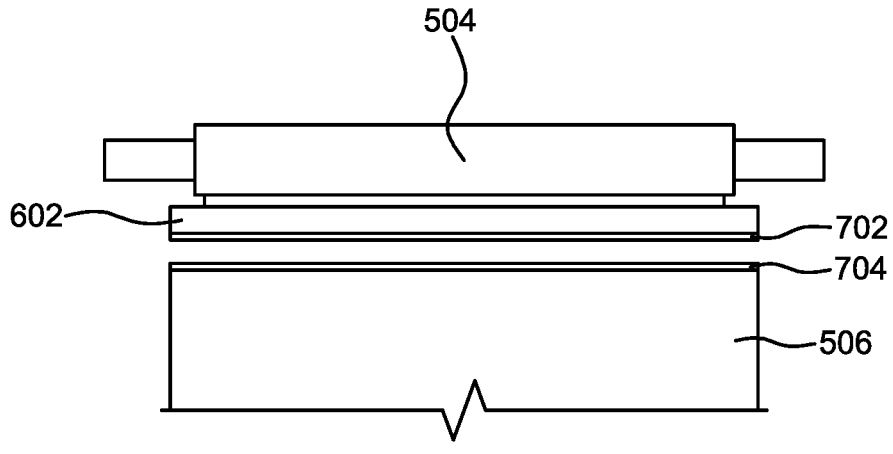
FIG. 7A depicts a third example bin engagement unit in accordance with the present disclosure.

Although the description above describes an aspect of locking/engaging the unit 504 with the bin 506 by using the protruding pins 604, the extrusions, the cavities 606, and/or the like, the present disclosure is not limited to such an arrangement of unit and bin locking. In some aspects, the plate 602 may not include the protruding pins 604 or the extrusions, but may instead include a sheet of a first gripping surface/material 702 disposed at the bottom surface 602*b*, as shown in FIG. 7A. In an exemplary aspect, the first gripping surface 702 may be disposed at the four edges of the bottom surface 602*b*. In this case, the bin top portion (e.g., bin edges at the bin top portion) may include a second gripping surface 704 that may be similar to the first gripping surface 702. The first and second gripping surfaces 702, 704 may be, for example, surfaces with high roughness (e.g., a granular rubber or a surface with high coefficient of friction) that may "mesh" or engage with each other to enable locking between the unit 504 and the bin 506.

In the example aspect described above and depicted in FIG. 7A, in operation, when the unit 504 may be in proximity to (e.g., above) the bin 506, the processor 114 may transmit command signals to the unit 504 to move the plate 602 to the extended position. Responsive to the plate 602 moving to the extended position, the first gripping surface 702 may engage with the second gripping surface 704, thereby locking the unit 504 with the bin 506. When the unit 504 and the bin 506 may be locked, the processor 114 may cause the unit 504 to slide the bin 506 on the base 102, as described above.

In some aspects, locking between the unit 504 and the bin 506 in the aspect described above may be possible due to friction force generated between the first and second gripping surfaces 702 and 704 and a "downward" force generated by the unit 504 to push against the bin 506. In further aspects, the unit 504 and/or the bin 506 may include springs or may use springs to enhance the downforce force, thereby enabling secure and robust locking between the unit 504 and the bin 506.

Figure 7B:
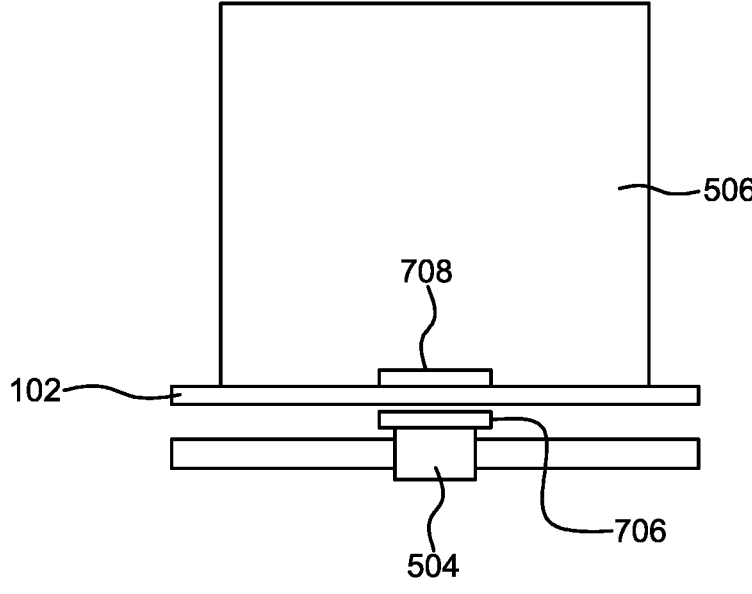
FIG. 7B depicts a fourth example bin engagement unit in accordance with the present disclosure.

In another aspect, the unit 504 may not be disposed above the bin 506 (as shown in FIGS. 5, 6A, 6B and 7A, and as described above), but may instead be disposed below the bin 506 (e.g., below the base 102), as shown in FIG. 7B. In this case, the unit 504 may include an electromagnet 706 and a bin bottom portion may include a magnet 708, or other suitable ferrous material.

During operation in this case, when the unit 504 may be disposed in proximity to the magnet 708, the processor 114 may actuate or activate the electromagnet 706 to cause the electromagnet 706 to magnetically couple with the magnet 708. Responsive to establishing magnetic coupling between the electromagnet 706 and the magnet 708, the unit 504 and the bin 506 may lock with each other. The processor 114 may then cause the unit 504 to move or slide the bin 506 on the base 102, as described above. Responsive to the bin 506 reaching the destination location, the processor 114 may de-energize or deactivate the electromagnet 706 to "release" the bin 506 or cause the magnetic coupling between the electromagnet 706 and the magnet 708 to end.

In the exemplary aspect described above, the magnetic coupling between the electromagnet 706 and the magnet 708 may be attractive. In other aspects, the magnetic coupling may be repulsive, without departing from the present disclosure scope.

In some aspects, to enable seamless and smooth bin movement on the base 102, the bins 506 may include chamfers, fillets or rollers around bin's periphery to prevent snagging. In further aspects, bin's periphery may be coated with low-friction material to enable smooth bin movement on the base 102 and minimize interference with adjacent bins.

Further, as described above in conjunction with FIG. 1, the bin bottom portion and the base top portion may be formed of materials with low-to-medium coefficient of friction, to enable the unit 504 to conveniently slide the bin 506 on the base 102. A person ordinarily skilled in the art may appreciate that materials with low-to-medium coefficient of friction may also result in unwanted bin movement (or sliding), e.g., when the vehicle 100 may be in motion. In order to ensure that unwanted bin movement is minimized on the base 102, the bins 506 may be placed in an optimal manner/arrangement on the base 102.

Figure 8B:
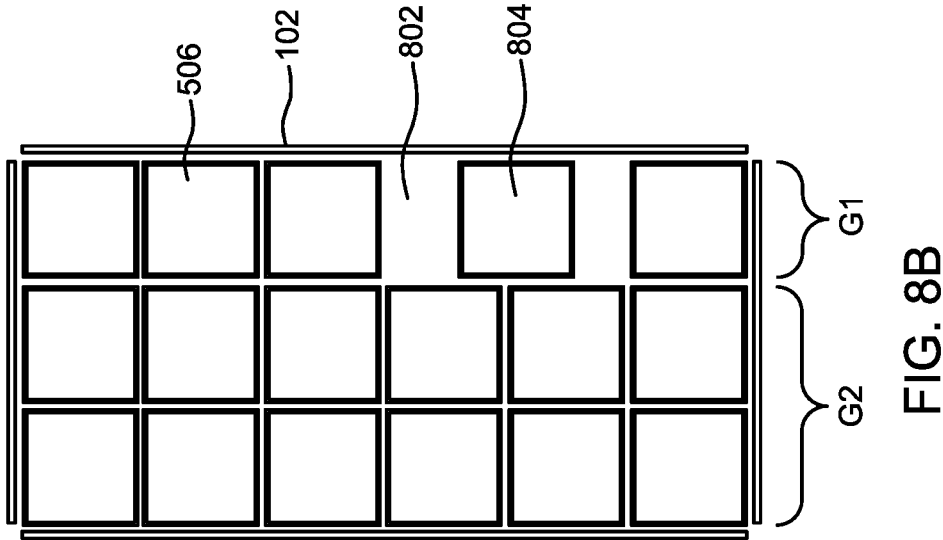
FIG. 8B depicts a top view of a base securing a plurality of bins in a second arrangement in accordance with the present disclosure.
Figure 8A:
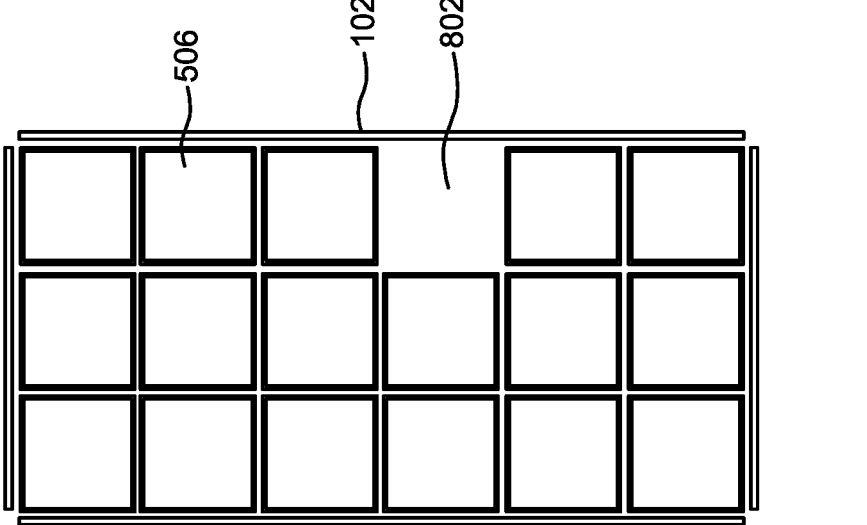
FIG. 8A depicts a top view of a base securing a plurality of bins in a first arrangement in accordance with the present disclosure.

A top view of an example first bin arrangement on the base 102 is depicted in FIG. 8A. As shown in FIG. 8A, one bin space 802 may be left empty/vacant on the base 102, to enable the unit 504 to move/slide the bins 506 on the base 102. When the bins 506 may not be required to be moved and when unwanted bin may be required to be prevented, the unit 504 may lock the bin space 802, as depicted in FIG. 6B and described above. A person ordinarily skilled in the art may appreciate that by locking the bin space 802, the entire grid of the bins 506 on the base 102 may be locked. In this manner, unwanted bin movement may be prevented.

A top view of an example second bin arrangement on the base 102 is depicted in FIG. 8B. As shown in FIG. 8B, a locking bin 804 (which may be any bin from the plurality of bins 506) may be partially placed and locked in the bin space 802. In this case, the bins 506 in a grid "G1" (that includes the bin space 802) may slightly slide when the vehicle 100 moves; however, the bins 506 in a grid "G2" (that may be adjacent to the grid "G1") may not move/slide. In this manner, unwanted bin movement for a substantial count of bins may be prevented by using the second bin arrangement described above. Further, in the second bin arrangement, when one or more bins may be required to be moved on the base 102 by using the unit 504, the locking bin 804 may be moved away from the bin space 802 by the unit 504, to enable bin movement as described above.

Figure 9:
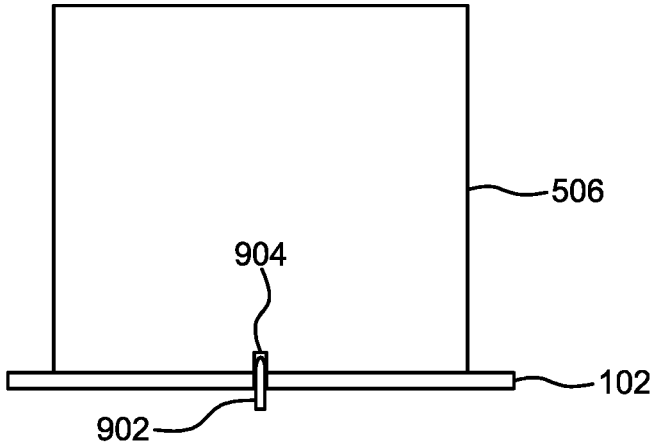
FIG. 9 depicts a side view of a bin secured to a base in accordance with the present disclosure.

Another way to prevent unwanted bin movement on the base 102 is depicted in FIG. 9. In the exemplary aspect depicted in FIG. 9, the base 102 may include a retention pin 902 and the bin base/bin bottom portion may include a cavity 904 (i.e., a mechanical attachment mechanism) of shape and dimensions corresponding to the retention pin 902. When the bin 506 may be required to be moved/slid on the base 102, the processor 114 or the vehicle on-board computer may actuate or energize the retention pin 902 to cause the retention pin 902 to retract to the base interior portion. On the other hand, when the bin 506 may be required to be secured on the base 102 to prevent unwanted bin movement, the processor 114 or the vehicle on-board computer may de-energize the retention pin 902 to cause the retention pin 902 to insert into the cavity 904 (i.e., move the retention pin 902 to its "default state"), thereby locking the bin 506 to the base 102.

In some aspects, the bin bottom portion may include one cavity 904, and hence may require one retention pin 902 to secure the bin 506 to the base 102. In other aspects, the bin bottom portion may include more than one cavity, and may hence require more than one retention pin to secure the bin 506 to the base 102. In some aspects, the retention pin 902 and/or the cavity 904 may be chamfered, conical, filleted or rounded to enable convenient retention pin insertion into the cavity 904.

Another way to prevent unwanted bin movement is to incorporate one or more electromagnets in the base 102 and one or more magnets/ferrous materials (i.e., electromagnetic attachment mechanism) in the bin base/bottom portion of each bin 506. In this case, the processor 114 or the vehicle on-board computer may energize the electromagnets in the base 102 to magnetically couple with the magnets/ferrous materials in the bins 506 to lock the bins 506 with the base 102, thereby preventing unwanted bin movement. Yet another way to prevent unwanted bin movement is to predict interference with the system 500 (e.g., when the vehicle 100 may be expected to travel on bumpy or inclined roads), and secure the bins 506 to the base 102 based on the prediction.

Figures 10A, 10B:
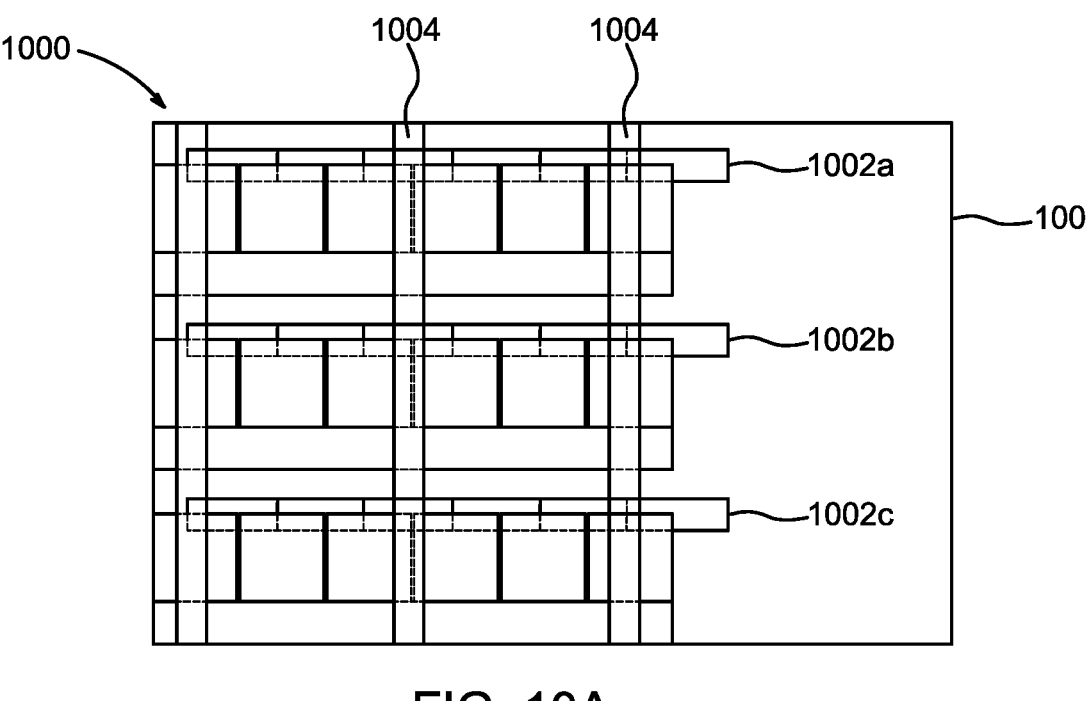
FIG. 10A depicts a first example arrangement of a gantry system in a delivery vehicle in accordance with the present disclosure.
FIG. 10B depicts a second example arrangement of a gantry system in a delivery vehicle in accordance with the present disclosure.

FIG. 10A depicts a first example arrangement of a gantry system 1000 (or system 1000) in the vehicle 100 in accordance with the present disclosure. The system 1000 may include one or more "sub-systems" 1002a, 1002b, 1002c, and/or the like. Each sub-system 1002a, 1002b, 1002c may be similar the system 200 or system 500 described above, and may be installed at different layers/levels within the vehicle interior portion. Each sub-system 1002a, 1002b, 1002c may "serve" or be configured to move bins with their respective layers/levels. Further, in the exemplary aspect depicted in FIG. 10A, the system 1000 may be encapsulated by a support structure 1004, which may be part of the vehicle 100 or the system 1000.

FIG. 10B depicts a second example arrangement of the system 1000 in the vehicle 100 in accordance with the present disclosure. In the exemplary aspect depicted in FIG. 10B, the sub-systems 1002a, 1002b, 1002c may be connected with each other to form a single gantry system. This single gantry system may serve bins in all the three layers/levels within the vehicle interior portion. In this case, the system 1000 may not be encapsulated by the support structure 1004, to enable convenient movement of bin engagement unit(s) of the single gantry system across layers/levels.

Figure 11:
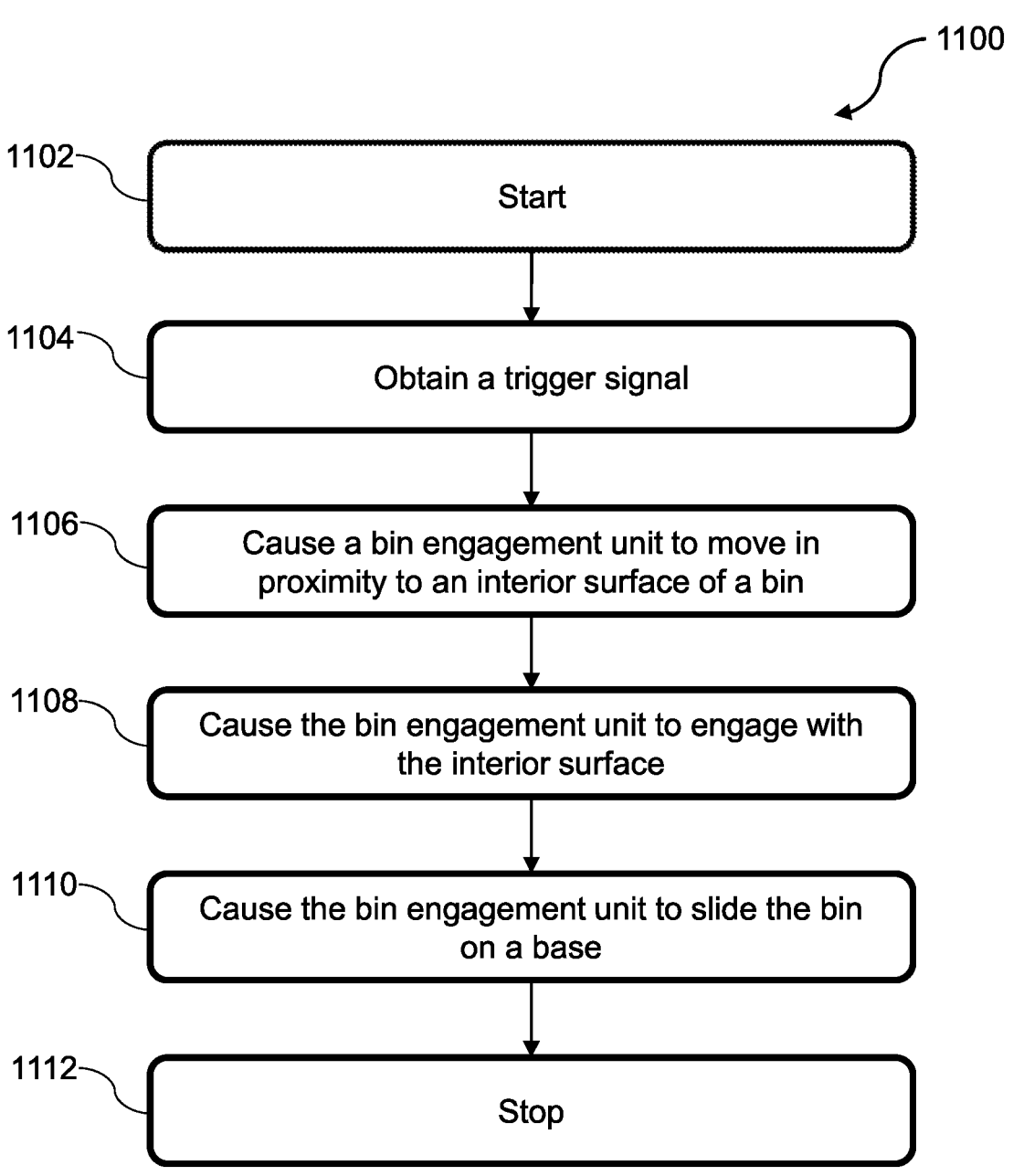
FIG. 11 depicts a flow diagram of a method for enabling bin movement in a delivery vehicle in accordance with the present disclosure.

FIG. 11 depicts a flow diagram of a method 1100 for enabling bin movement in the vehicle 100 in accordance with the present disclosure. FIG. 11 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 1100 starts at step 1102. At step 1104, the method 1100 may include obtaining, by the processor 114, the trigger signal or the command signal from the vehicle on-board computer, the server and/or the user device associated with the vehicle operator. At step 1106, the method 1100 may include causing, by the processor 114, the unit 210 to move in proximity to the interior surface 404, responsive to obtaining the trigger signal.

At step 1108, the method 1100 may include causing, by the processor 114, the unit 210 to engage with the interior surface 404, responsive to moving in proximity to the interior surface 404. At step 1110, the method 1100 may include causing, by the processor 114, the unit 210 to slide the bin 202 on the base 102, responsive to engaging with the interior surface 404.

The method 1100 ends at step 1112.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a base configured to secure a plurality of bins, wherein:
  each bin comprises a plurality of sidewalls and a plurality of corners disposed at intersections between respective pairs of the sidewalls, and
  each sidewall comprises an interior surface and an exterior surface; and
a bin engagement unit configured to move in a two-dimensional (2D) space in proximity to the base, wherein the bin engagement unit is configured to engage with the interior surfaces of the sidewalls at the corners of a bin, from the plurality of bins, and slide the bin on the base when the bin engagement unit engages with the interior surface.

2. The vehicle of claim 1, further comprising:
a first rail and a second rail disposed parallel to each other at a first predefined distance, wherein the first rail and the second rail are disposed at a second predefined distance above the base; and
a third rail disposed perpendicularly between the first rail and the second rail, wherein the third rail is configured to slide along a first rail length and a second rail length.

3. The vehicle of claim 2, wherein the bin engagement unit is disposed on the third rail, and wherein the bin engagement unit is configured to slide along a third rail length.

4. The vehicle of claim 3, further comprising a power source, wherein the power source is configured to provide power to the bin engagement unit via the third rail and at least one of the first rail and the second rail.

5. The vehicle of claim 1, wherein the bin engagement unit comprises a plurality of telescopic arms, and wherein each telescopic arm is configured to move between an arm retracted position and an arm extended position.

6. The vehicle of claim 5, wherein each telescopic arm presses against the interior surfaces of a respective pair of the sidewalls at one of the corners of the bin when each telescopic arm is in the arm extended position to enable the bin engagement unit to engage with the interior surfaces of the respective pair of the sidewalls.

7. The vehicle of claim 5, wherein each sidewall comprises a cut-out disposed at a sidewall top portion, and wherein the cut-out extends from the interior surface to the exterior surface of the sidewall and from a top end toward a bottom end of the sidewall.

8. The vehicle of claim 7, wherein the bin engagement unit is configured to move in the 2D space in proximity to the base through the cut-outs of the plurality of sidewalls of the plurality of bins, without interfering with the plurality of bins, when each telescopic arm is in the arm retracted position.

9. The vehicle of claim 1, further comprising a processor communicatively coupled with the bin engagement unit, wherein the processor is configured to:
obtain a trigger signal;
cause the bin engagement unit to:
  move in proximity to the interior surface responsive to obtaining the trigger signal;
  engage with the interior surface responsive to moving in proximity to the interior surface; and
  slide the bin on the base responsive to engaging with the interior surface.

10. The vehicle of claim 9, wherein the trigger signal comprises a bin source location and a bin destination location on the base, and wherein the bin engagement unit slides the bin from the bin source location to the bin destination location responsive to engaging with the interior surface.

11. The vehicle of claim 9, wherein the processor obtains the trigger signal from a user device or a server.

12. The vehicle of claim 1, wherein the bin engagement unit comprises at least one of: a rechargeable battery, a transceiver and a camera.

13. The vehicle of claim 1, wherein the base is disposed in a vehicle interior portion.

14. The vehicle of claim 1, wherein each bin further comprises a bin base, and wherein the bin base comprises an attachment mechanism configured to secure the bin on the base.

15. The vehicle of claim 14, wherein the attachment mechanism comprises at least one of a mechanical attachment mechanism and an electromagnetic attachment mechanism.

16. The vehicle of claim 1, wherein the bin engagement unit comprises a plate configured to engage with a top portion of the bin, and slide the bin on the base when the bin engagement unit engages with the top portion of the bin.

17. The vehicle of claim 16, wherein the plate comprises at least one of: a protruding pin and a gripping surface configured to engage with the top portion of the bin.

* * * * *